United States Patent [19]

Ruppert

[11] 3,969,660

[45] July 13, 1976

[54] REGENERATIVE MOTOR CONTROL WITH IMPROVED CIRCUIT MEANS

[75] Inventor: Arnold Ruppert, Cambridge (Galt), Canada

[73] Assignee: Allen-Bradley Company, Milwaukee, Wis.

[22] Filed: Aug. 2, 1974

[21] Appl. No.: 494,228

[52] U.S. Cl. ............................... 318/338; 318/327
[51] Int. Cl.² .......................................... H02P 5/04
[58] Field of Search ............ 318/338, 327, 326, 302

[56] References Cited
UNITED STATES PATENTS

| | | |
|---|---|---|
| 3,435,316 | 3/1969 | Wilkerson ............................ 318/302 |
| 3,456,177 | 7/1969 | Wilkerson ........................ 318/338 X |
| 3,458,790 | 7/1969 | Wilkerson ........................ 318/338 X |
| 3,475,671 | 10/1969 | Wilkerson ........................ 318/338 X |
| 3,541,414 | 11/1970 | Wilkerson ........................ 318/338 X |
| 3,599,064 | 8/1971 | Friedman ............................ 318/338 |

*Primary Examiner*—B. Dobeck
*Attorney, Agent, or Firm*—Andrus, Sceales, Starke & Sawall

[57] ABSTRACT

A regenerative motor control of the field reversing type includes a field circuit for energizing the motor field and an armature circuit for energizing the motor armature. An analog signal generating means, typically a multiplier, is coupled to the armature circuit and is operable by a bi-polarity motor operative condition error signal and a bi-polarity field current direction and magnitude signal for energizing the motor armature and for providing deenergization, as well as improved reenergization of the armature, during the transient period between motoring and regenerative operation.

17 Claims, 6 Drawing Figures

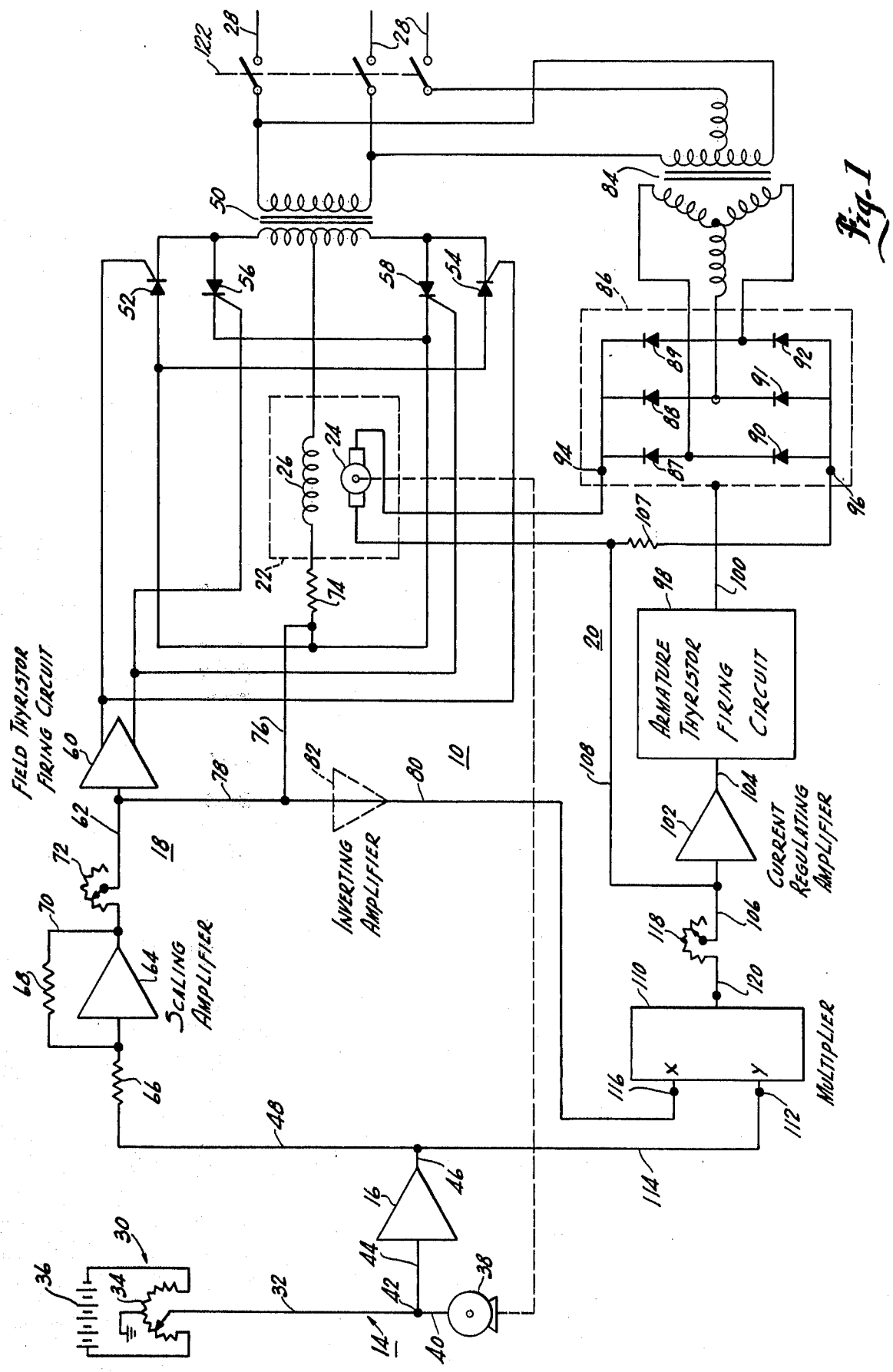

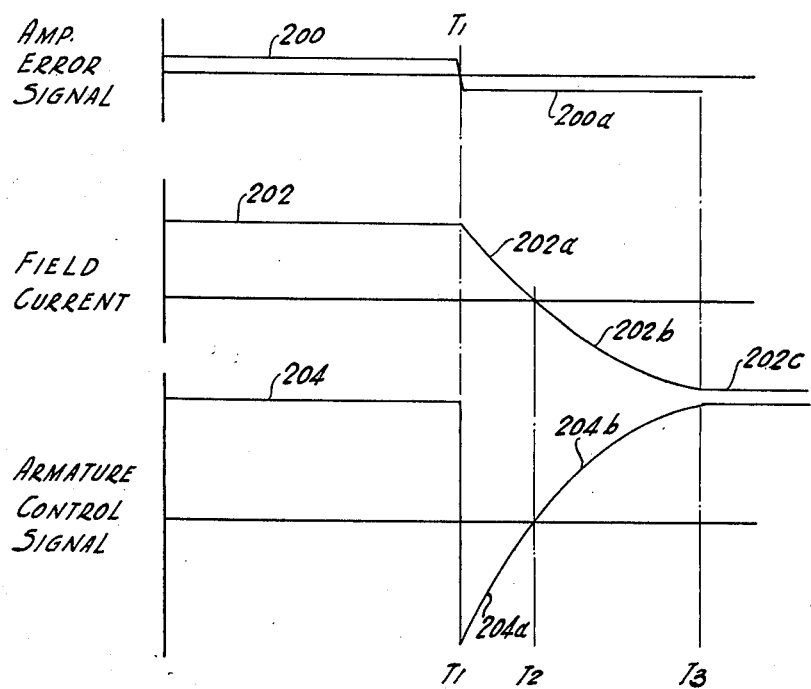
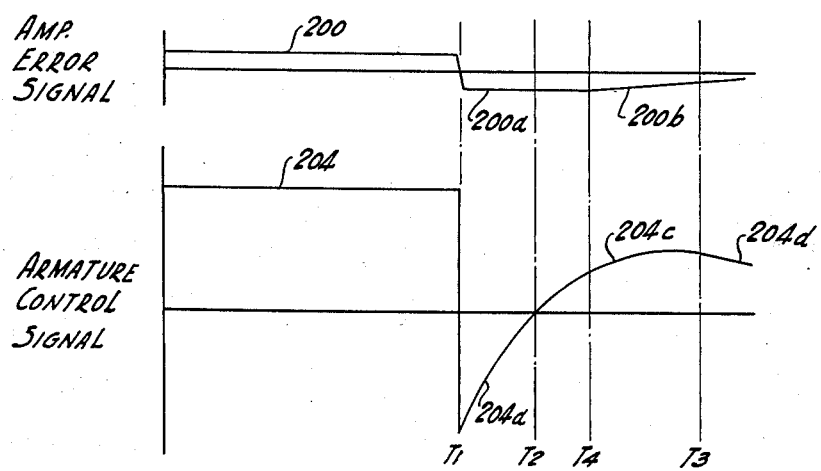

REGENERATIVE MOTOR CONTROL WITH IMPROVED CIRCUIT MEANS

BACKGROUND OF THE INVENTION

1. Field of the Invention

The present invention relates to regenerative direct current motor controls which provide regenerative braking by reversing the motor field. More specifically, the present invention is directed to such a control having an improved means for regulating the energization of the motor armature.

2. Description of the Prior Art

In regenerative direct current motor controls, the braking of the motor necessary for precise speed regulation or other desired operating characteristics is obtained by applying the power generated in the motor during braking back to the active power source for the motor, such as a.c. supply lines.

Regenerative braking is advantageous in that, with proper control of armature current, braking may be done on a permanent basis, whereas resistive braking or other methods, such as plugging, are normally utilizable only in transient conditions or for isolated stops. Braking may also be accomplished very rapidly by regeneration.

Power may be regenerated or returned to the active motor power source by maintaining the same polarity of motor armature voltage while reversing the direction of armature current flow, as in "armature reversing" regenerative motor controls. Motor power may also be regenerated by maintaining motor armature current flow in the same direction while reversing the polarity of the armature voltage. Armature voltage reversal is obtained by reversing the motor field. A motor control employing this technique is termed a "field reversing" regenerative control and is the type to which the present invention is directed. A field reversing control includes a field circuit for reversing the motor field and an armature circuit for coordinately controlling the motor armature current.

In regenerative braking operation, the reversal of the motor field reverses the polarity of the motor flux and the armature counter e.m.f., assuming the direction of motor rotation remains instantaneously the same. The reversed counter e.m.f. biases the thyristors in a thyristor bridge between the a.c. supply lines and the motor armature for current conduction in the same direction as during motoring anytime the counter e.m.f. is more negative than the a.c. supply lines voltage. This will include a portion of the negative half cycles of the alternating current power, thus permitting the reversal of voltage necessary for regeneration.

A problem in the design and operation of field reversing regenerative motor controls in the past has been proper regulation and protection of both the motor and control in the transient period of the field winding energization occurring at the transition from motoring to regenerative operation, and vice versa. During this time interval the motor field weakens in one direction of current flow, reverses, and increases in the other current flow direction. The transient period occurs because the reversal of the field winding current necessary for regeneration cannot be achieved instantaneously due to the inductance of the motor field winding.

In the armature circuit, it is highly desirable to have small or zero armature current under weak field conditions thereby to prevent speed increases as field strength weakens and commutator sparking due to armature reaction. U.S. Pat. No. 3,475,671, describes various ways by which deenergization of the armature circuit and a reduction of armature current may be obtained, including the technique of reversing the polarity of the controlling signal in the armature circuit in the initial portions of the transient period, prior to field reversal. This controlling signal alteration rapidly reduces and maintains the armature current at zero during this portion of the transient field.

In the circuitry disclosed in the foregoing patent, the polarity of a field winding signal is used to operate a digital logic type switch means between a pair of discrete switching states which establish the application and polarity of error signal as the controlling signal in the armature circuit.

However, once field reversal has been accomplished the gain and other control requirements of the armature circuit necessary for precise speed control tend to drive the armature current immediately to rated value in the terminal portion of the transient period after field reversal causing weak field commutator sparking and undesirable suddenness in the commencement of regenerative braking action.

The sudden reapplication of armature current may be overcome by establishing the magnitude of the armature current in accordance with the magnitude of the field winding current. Thus as the field winding current slowly increases after field reversal, in accordance with the inductive characteristics of the field winding, the magnitude of the armature current will similarly increase. U.S. Pat. No. 3,458,790 shows such a control in which the armature current is established by or "follows" the field current in the transient period.

While the armature current in the terminal portion of the transient period established by the field follower technique is less than might otherwise exist, such current may also be greater than is actually required by existing operating conditions in the motor. Excessive armature current is again present in the motoring during the terminal portion of the transient period.

SUMMARY OF THE PRESENT INVENTION

It is, therefore, the object of the present invention to provide an improved regenerative motor control of the field reversing type and more particularly to provide such a control containing signal generating circuitry for enhancing the operation of the armature circuit of the control, including the transient period of the field winding energization occurring between motoring and regenerative operation.

The foregoing is accomplished by employing an analog signal generating means, typically an algebraic or four quadrant multiplier, to control a signal polarity responsive armature circuit means in the regenerative control. A motor error signal is applied to one input of the multiplier. The polarity of the error signal indicates whether motoring or regenerative operation is required. The magnitude of this error signal indicates, in general, the amount of motoring or regenerative action necessary to reduce the speed error. A second polarity signal responsive to the direction and magnitude of field winding current flow is supplied to another input of the multiplier.

The multiplication of these signals will provide an output signal having the proper polarity to energize the armature circuit means and the motor armature in accordance with output signal magnitude, except during the initial portion of the transient period prior to field winding current reversal. During this interval an opposite polarity signal will be provided which reduces armature energization to zero.

In the terminal portion of the transient period, the field winding current signal applied to the multiplier establishes a maximum value for the armature current while reductions in the error signal operate the multiplier to provide any lesser value of armature current required by operative conditions in the motor.

The present invention thus combines the most desirable features of each of the prior art controls noted above while providing, among other improvements, that the armature current may assume any magnitude less than the maximum value established by the field current warranted by conditions in the motor. The lowest armature current commensurate with satisfactory operation of the motor is thus established throughout the transient period, with an attendant enhancement in the operation of the motor and control.

BRIEF DESCRIPTION OF THE DRAWING

FIG. 1 is a schematic diagram of the improved regenerative direct current control of the present invention.

FIGS. 2a, b, c, d, and e are wave forms illustrating the operation of the motor control of FIG. 1.

DESCRIPTION OF THE PREFERRED EMBODIMENT

General

Referring now to FIG. 1, there is shown therein regenerative direct current motor control 10 constructed in accordance with the present invention. Control 10 utilizes reference and feedback circuit 14 and includes input amplifier 16, field circuit 18, and armature circuit 20. The control drives direct current motor 22 having an armature 24 and a field 26, each of which includes or comprises an electromagnetic winding. The control is provided with input power from a.c. lines 28.

Reference and Feedback Circuit

Reference and feedback circuit 14 includes a reference signal source 30 providing a variable d.c. signal to conductor 32 by means of d.c. supply 36 and potentiometer 34. A feedback signal may be provided by tach-generator 38 which is connected to armature 24 and supplies a d.c. signal corresponding to the speed of armature 24 to conductor 40. Feedback signals corresponding to other operative conditions in the motor, such as torque, or operational conditions in the apparatus driven by the direct current motor, as for example, web tension, may be used. Hence, the control of the present invention is not to be construed solely as a motor speed control. Conductors 32 and 40 are joined at mixing junction 42 which provides an error signal to conductor 44. This error signal may be of either polarity and serves as a motoring control signal in one polarity and as a regenerative braking control signal in the other polarity.

Input Amplifier

The error signal in conductor 44 is applied to input amplifier 16. Amplifier 16, which is typically of the high gain type, provides a bi-polarity output signal having a magnitude proportional to the input signal up to an abrupt saturation point. A typical circuit which may be employed as amplifier 16 is shown on page 119 of the Transistor Manual, published by the General Electric Company, 7th edition, 1964.

The output signal of amplifier 16 in conductor 46 is provided to field circuit 18 in conductor 48 and to armature circuit 20 in conductor 114.

Field Circuit

Field circuit 18 is supplied with input alternating current from a.c. supply lines 28 through transformer 50. The center tap of the secondary winding of transformer 50 is connected to one end of motor field winding 26. The ends of the secondary winding of transformer 50 contain two groups of oppositely poled thyristors 52 and 54 and 56 and 58 connected to the other end of winding 26. These thyristors control the direction of current flow through motor field winding 26, one group of thyristors being energized for each direction of current flow. A field thyristor firing circuit 60, which may be deemed a push-pull amplifier, controls the operation of thyristors 52 through 58 in response to an input signal provided in conductor 62. The control provided by field thyristor firing circuit 60 determines which group of thyristors will be placed in the conductive state and the magnitude of field current. A typical circuit which may be employed as field thyristor firing circuit 60 is shown on page 59 of the SCR manual published by the General Electric Company, 2nd edition, 1961 or in U.S. Pat. No. 3,484,676.

The input signal in conductor 48 from amplifier 16 to field circuit 18 is provided to scaling amplifier 64. This amplifier determines the relationship or proportionality between the magnitude of the error signal in conductors 44-46 and the magnitude of the field winding current, including the error signal level which saturates circuitry of field circuit 18 so that additional increases in the error signal have no further effect on the field circuit. Scaling amplifier 64 may be an operational amplifier, the gain, and hence the scale, of which is determined by the ratio of the input resistor 66 in conductor 62 to resistor 68 in feedback conductor 70. The output of scaling amplifier 64 is applied to potentiometer 72 which establishes the maximum field current magnitude. Potentiometer 72 is connected to conductor 62 and the input of field thyristor firing circuit 60.

Field circuit 18 also contains resistive means 74 connected in series with motor field winding 26. This resistive means acts as a means for sensing the polarity and magnitude of the current in motor field winding 26. Resistor 74 provides a feedback signal in conductors 76 and 78, corresponding to the magnitude of the current in the motor field winding, to the input of field thyristor firing circuit 60 for causing the magnitude of the motor current to correspond to the signal in conductor 62 from potentiometer 72. The field current signal from resistor 74 is also provided in conductor 80. To facilitate the operation of motor control 10, as hereinafter described, it may be desirable to provide a polarity inversion to one of the signals found in control 10. This may be conveniently accomplished, for example, by inverting amplifier 82 in conductor 80.

Armature Circuit

Armature circuit 20 is supplied with power from a.c. supply lines 28 through transformer 84. The amount of power provided to motor armature 24 is controlled by armature thyristor bridge 86 interposed between transformer 84 and motor armature 24. Bridge 86 contains thyristors 87 through 92. Bridge terminals 94 and 96 constitute the output terminals of control 10 at which the voltage reversal necessary for regenerative operation takes place.

Armature thyristor firing circuit 98 controls the operation of the thyristors in armature thyristor bridge 86 by means of firing signals in conductor 100. In order for control 10 to provide regenerative operation, armature thyristor firing circuit 98 must be capable of controlling the operation of the thyristors through at least a portion of both the positive and negative half cycles of the alternating current from supply lines 28. The firing circuit is further constructed to employ input signals of one polarity, as for example, the positive polarity, to provide output signals to thyristor bridge 86 which cause the latter to provide current to energize motor armature 24 during both motoring and regeneration. Input signals of the opposite polarity force firing circuit 98 off and cause the bridge output and armature energization to be reduced to zero. Such a firing circuit may be provided by altering the phase relationship of the synchronizing voltages to the circuit shown on page 132 of the aforementioned SCR Manual to permit the circuit to operate for the portion of the other half cycle. A suitable firing circuit is also shown in U.S. Pat. Nos. 3,456,176 and 3,486,102.

A current regulating amplifier 102 provides a bipolarity input signal to armature thyristor firing circuit 98 in conductor 104. Current regulating amplifier 102 regulates the armature current during motoring and regenerative operation and utilizes a signal provided in conductor 106 as a reference and the armature current feedback signal from a sensing means, such as resistor 107, in conductor 108 as a feedback signal.

In the regenerative motor control 10 of the present invention a multiplier 110 is employed to provide the necessary coordination between field circuit 18 and armature circuit 20. As its name implies, multiplier 110 is a device which provides an output signal comprising the product of two input signals. It is preferable that multiplier 110 be capable of algebraic multiplication so that the multiplication of a positive quantity and a negative quantity yields a negative product, the multiplication of two negative quantities yields a positive product, etc. Such multipliers are often termed "four quadrant multipliers". While numerous types of such multipliers exist, including rotating devices, Hall effect generators, and the like, a semi-conductor multiplier is at present preferred. The monolithic, four quadrant multiplier made and sold by Motorola Semiconductors of Phoenix, Arizona under the designation "MC1494L" may be utilized as multiplier 110.

The input signal applied to one input terminal 112 of multiplier 110 comprises the output signal of amplifier 16 in conductor 46, provided via conductor 114. The signal applied to the other input terminal 116 of multiplier 110 is the signal corresponding to motor field current magnitude and polarity in conductor 76, via conductor 80. The inputs to a multiplier are often termed the X and Y signals and are so noted in FIG. 1. The output signal of multiplier 110, which comprises the product of the input signals, is provided to potentiometer 118 in conductor 120 and to current regulating amplifier 102 in conductor 106. Potentiometer 118 establishes the maximum level of armature current.

Operation

Prior to operating control 10, scaling amplifier 64 in field circuit 18 is adjusted to establish the magnitudinal relationship between the error signal in conductors 46 and 48 and the field current. The gain or scale of amplifier 64 may typically be adjusted so that the amplifier saturates at a relatively small error signal level, for example, one tenth of the full value of the error signal existing at saturation of amplifier 16. Scaling amplifier 64 thus provides a substantially constant output signal over the operating range of control 10.

The gain or scaling of scaling amplifier 64 may be decreased, if desired, to expand the range in which the field strength is proportional to the error signal in conductors 46 and 48. In the proportional range, the operational characteristics of motor 22 will resemble those of a series motor.

To operate motor 22, switch 122 in a.c. supply lines 28 is closed to energize the circuit of control 10. Reference signal source 30 is adjusted to provide a signal having a magnitude corresponding to the desired speed of motor 22 and a polarity corresponding to the desired direction of rotation. It may be assumed for exemplary purposes that the reference signal has a positive polarity. The reference signal is supplied through conductor 32 to junction 42 and thence to amplifier 16. Amplifier 16 produces an output in conductor 46 proportional in magnitude and polarity to the input signal. An armature 24 is not yet rotating, no feedback signal will be supplied by tach-generator 38.

Field circuit 18 utilizes the polarity of the output signal of amplifier 16 in conductors 46 and 48 to turn on either thyristors 52 and 54 or thyristors 56 and 58 by means of field thyristor firing circuit 60 so as to control the direction of rotation of motor 22. For example, thyristors 52 and 54 may be turned on by the positive polarity signal in conductors 46, 48 and 62.

The absence of a feedback signal causes a relatively large magnitude error signal in conductors 46 and 48. The signal drives scaling amplifier 64 into saturation and causes field thyristor firing circuit 60 to fire thyristors 52 and 54 to provide a full field strength current to field winding 26. Field thyristor firing circuit 60 receives a negative polarity feedback signal from resistor 74 in conductors 76 and 78 which regulates that circuit and the firing of thyristors 52 and 54 to the full field strength state.

The field current feedback current in conductor 72 is also provided in conductor 80 through inverting amplifier 82 to provide a positive polarity signal to input terminal 116 of multiplier 110. Since the field winding current is substantially constant in magnitude, the input signal to input terminal 116 of multiplier 110 will, similarly, be constant in magnitude.

The positive polarity output signal from amplifier 16 is applied to the other input terminal 112 of multiplier 110. Multiplier 110 multiplies the two input signals to provide an output signal which is the product of the two input signals. Inasmuch as the input signal in conductor 80 from field circuit 18 is constant, the output signal of multiplier 110 in conductor 108 will be proportional to the error signal from amplifier 16 provided to input terminal 112. Since both the input signals to multiplier 110 are positive in polarity, the output signal in conductor 120 will similarly be of the positive polarity.

The output signal of multiplier 110 is applied to current regulating amplifier 102 in conductor 106 and to armature thyristor firing circuit 98 in conductor 104. Armature thyristor firing circuit 98 provides a firing signal to the thyristors of armature thyristor bridge 86 in conductor 100 proportional to the output of multiplier 110 to energize and accelerate armature 24.

The acceleration of armature 24 causes tach-generator 38 to generate a feedback signal in conductor 40 which reduces the magnitude of the error signal in conductor 44. This similarly reduces the magnitude of the output signal of amplifier 16 in conductor 46. This reduction has no effect on the field circuit due to the high gain and saturation of scaling amplifier 64. The input signal from field circuit 18 to multiplier 110 in conductor 80 remains constant. The reduction in error signal in conductor 44 does reduce the signal applied to terminal 112 and hence the product output signal of multiplier 110. This causes armature thyristor firing circuit 98 to retard the firing angles of the thyristors in armature thyristor bridge 86 to reduce the armature current and the acceleration of armature 24 so that motor 22 assumes the speed established by reference signal source 30.

Control 10 continues to operate in this manner during the motoring operation of motor 22, the regulation of motor speed being obtained by controlling the firing of the thyristors in thyristor bridge 86 in accordance with the error signal in conductor 44.

If field strength is also proportional to the error signal in conductor 44, due to a reduction in the gain of scaling amplifier 64, the regulation of motor speed is obtained by controlling both field current and armature current. Both inputs to multiplier 110 will be proportional to the error signal.

As noted above, armature circuit 20 of control 10 utilizes the product output signal of multiplier 110 in conjunction with the current feedback signal in conductor 108 to control armature current in both motoring and regenerative operation. Assuming motor 10 is being operated at constant field, armature current will be proportional to the error signal in conductor 114 from amplifier 16. When the error signal in conductor 44 becomes large enough to saturate the output of amplifier 16 in conductor 114 the output signal of multiplier 110 becomes constant. The maximum armature current is thus sharply limited to a value corresponding to the constant output of multiplier 110 by the current regulating action of current regulating amplifier 102 and the current feedback signal in conductor 108.

The operation of control 10 in the steady state motoring condition is shown in FIG. 2 by the portions of the wave forms existing prior to time $T_1$. FIG. 2a shows the positive polarity error signal 200 from amplifier 16 in conductor 46. FIG. 2b shows the field current 202 in motor field winding 26 and FIG. 2c shows the controlling signal 204 in conductor 106 to current regulating amplifier 102 and armature thyristor firing circuit 98.

Regenerative operation of control 10 may be brought on by reducing the reference signal in conductor 32 or by providing an overhauling load to armature 24.

In either case the feedback signal generated by tech-generator 38 in conductor 40 exceeds the reference signal generated by reference signal source 30 in conductor 32. This reverses the polarity of the error signal in conductor 44. The polarity of the output signal from amplifier 16 also reverses from positive to negative, as shown in FIG. 2a by the polarity reversal of signal 200 to signal 200a occurring at time $T_1$. The high gain and saturation of amplifier 16 provides substantially instantaneous reversal and a constant magnitude negative polarity signal in conductor 46.

The reversed polarity of the output signal from amplifier 16 to field thyristor firing circuit 60 causes the latter to deenergize thyristors 52 and 54 and energize thyristors 56 and 58 in field circuit 18 to commence the reversal of the energization of motor field 26. The field current starts to decay at a rate determined by the inductance of the motor field winding and the applied voltage established by field thyristor firing circuit 60 as shown by the wave form 202a in FIG. 2b. The field current feedback signal in conductors 76, 78 and 80 correspondingly decreases in magnitude.

The signal in conductor 80 to multiplier 110 is positive in polarity and resembles the wave form 202a. The positive polarity field current feedback signal in conductor 80 is applied to input terminal 116 of multiplier 110. The negative polarity output signal 200a from amplifier 16 is applied to input terminal 112 of multiplier 110 in conductor 114. Inasmuch as a positive polarity input signal is applied to input terminal 116 and a negative polarity input signal is applied to input terminal 112, the algebraic multiplication performed by multiplier 110 provides a negative polarity signal 204a in conductors 120, 106, and 104. The negative signal in conductor 104, when applied to armature thyristor firing circuit 98, is of a polarity to force the output of armature thyristor firing output circuit 98 immediately to zero. This similarly reduces the armature energization to zero, preventing commutator sparking due to armature reaction or increases in motor speed due to field weakening.

The magnitude of negative polarity signal 204a is the product of the generally constant magnitude signal 200a in conductor 114 and the decreasing field current feedback signal 202a in conductor 80. Signal 204a is thus of large negative magnitude immediately subsequent to time $T_1$ to drive armature thyristor firing circuit 98 off the thereafter decreases in accordance with the field current feedback signal to hold armature thyristor firing circuit 98 in the deenergized condition.

When the field current falls to zero, as at time $T_2$ in FIG. 2b, and reverses direction, the polarity of the field current feedback signal 202b in conductors 72 and 80 to input terminal 116 of multiplier 110 also reverses so that a negative signal is now applied to the input terminal. The algebraic multiplication performed by multiplier 110 provides a positive polarity output signal 204b from the two negative input signals. The positive polarity output signal in conductor 120 when applied to armature thyristor firing circuit 98, is such as to reenergize motor armature 24. The signal operates armature thyristor firing circuit 98 to fire the thyristors in bridge 86 in the portions of the negative half cycles of the a.c. supply in which the a.c. supply voltage is more positive than the reversed counter e.m.f. provided by the reversed motor field thereby to cause motor 24 to regenerate power back to the a.c. supply.

Assuming the input signal from amplifier 16 to multiplier 110 is constant, the magnitude of the signal 204b to armature thyristor firing circuit 98 is proportional to field current feedback signal 202b. It thus starts at zero at time $T_2$ and thereafter increases slowly in magnitude to provide the desired smooth application of regenerative braking action. At time $T_3$, motor field 26 obtains full strength 202c in the opposite direction and the transient period concluded.

The regeneration of power back to the a.c. supply will brake the speed of motor 22. When sufficient braking has been applied to reduce the speed of motor 22 to the desired level, as indicated by the reference signal in conductor 32, the feedback signal in conductor 40 will approach, equal, and again become less than the reference signal. This will prepare control 10 for motoring operation by reversing the polarity of the signal in conductors 44, 46, 48, and 114 back to the positive polarity and initiating another transient period. Reversal of the motor field back to the direction indicated by the numeral 202 in FIG. 2b is commenced.

Prior to the time the field current reverses, there will be a negative input signal to input terminal 116 of multiplier 110 from field circuit 18 and a positive polarity signal to input terminal 112 from amplifier 16. The algebraic product of the negative and positive polarity signals will be a negative polarity signal in conductor 120 which will again force the output of armature thyristor firing circuit 98 immediately to zero causing a similar reduction armature current.

When the field current has reversed, a positive polarity signal will appear in conductor 80 at input terminal 116 of multiplier 110. The positive signals now appearing at input terminals 116 and 112 of multiplier 110 will reestablish a positive output signal in conductor 120 to armature thyristor firing circuit 90 and the energization of armature 24. Motor 22 then resumes operation in the motoring state under the control of the reference signal in conductor 32 and the feedback signal in conductor 40.

During the transient period the speed of motor 22 may decrease due to friction or other speed reducing factors as well as through the regenerative braking applied in the terminal portions of the period. In control 10 of the present invention this circumstance will be reflected in a reduction in the magnitude of the armature current and the amount of regenerative braking provided to the motor after time $T_2$, smoothing the regenerative braking action and lending additional preciseness to the regulation of the operative condition of the motor.

For example, in FIG. 2d, the speed of motor 22 decreases at time $T_4$ causing a corresponding reduction 200b in the signal from amplifier 16. Due to the multiplication provided by multiplier 110, the product signal 204c from multiplier 110 to armature thyristor firing circuit 98 subsequent to time $T_4$ shown in FIG. 2e, reflects the decreased magnitude of input signal 200b. Signal 204c of FIG. 2e is thus less than signal 204b in FIG. 2c. The level of the armature control signal supplied after the conclusion of the transient period, shown as signal 204d in FIG. 2e, is also less.

Inasmuch as neither amplifier 16 nor field circuit 18 are saturated in the period subsequent to time $T_4$, the armature current is proportional to the product of the two variable magnitude input signals to multiplier 110.

Through the operation of multiplier 110, the field current feedback signal in conductor 80 forms a variable current limit for the armature circuit in the transient period $T_1 - T_3$ and particularly during the interval $T_2$ to $T_3$. This variable current limit establishes the maximum value of the armature current at any given instant in accordance with the characteristics of wave form 202b. However, below the maximum armature current level established by the field current feedback signal, the armature current is free to assume any lesser value established by the speed error signal from amplifier 16, as shown in FIGS. 2d and 2e. The performance of control 10 in motor 22 is thereby improved.

Various modes of carrying out the invention are contemplated as being within the scope of the following claims particularly point out and distinctly claiming the subject matter which is regarded as the invention.

I claim:
1. A regenerative motor control for regulating the operative condition of a direct current motor from a power source between the motoring and regenerative states in accordance with a bi-polarity operative condition error signal produced by a motor operative condition error signal source, said control comprising:
   a field circuit means having an input couplable to said error signal source and an output connectable to the field winding of the motor, said field circuit means being responsive to said error signal for providing current energization in either direction from the power source through the motor field winding and for reversing the current energization from a first direction through zero to a second direction during a transient period initiated by a reversal of the polarity of the error signal;
   signal means connected to said field circuit means for providing a signal proportional in magnitude to the magnitude of the motor field winding current energization and having a polarity indicative of the direction of said energization;
   an armature circuit means having an output connectable to the armature winding of the motor for energizing the armature winding from the power source responsive to the magnitude of a controlling signal of a preselected polarity applied to an input thereof, the energization of the armature winding providing motoring operation to the motor for one direction of field winding current energization and providing regenerative operation to the motor, for the motoring direction of motor rotation, for the other direction of field winding current energization; and
   analog signal generating means mathematically combining the magnitude and polarity characteristics of input signals applied to at least a pair of inputs for determining the magnitude and polarity characteristics of a resultant output signal provided at an output of said means, one of said inputs being couplable to said error signal source, the other of said inputs being coupled to said signal means for receiving said field winding current energization signal, sid output being coupled to the input of said armature circuit means for providing a controlling signal to said armature circuit means having the preselected polarity during the motoring and regenerative states of the motor.

2. The regenerative motor control according to claim 1 wherein the armature circuit means is further defined as responsive to the opposite polarity of the controlling signal for reducing the armature winding energization to zero and said analog signal generating means is further defined as means for providing a controlling signal to said armature circuit means having the opposite polarity during the interval in which the field winding current energization is decreasing from the first flow direction to zero.

3. The regenerative motor control according to claim 1 wherein said analog signal generating means is further defined as multiplier means for providing an output signal which is the product of input signals applied to the inputs thereof.

4. The regenerative motor control of claim 2 wherein said field signal circuit means is further defined as providing a bi-polarity signal and said multiplier means is further defined as algebraic multiplier means for providing an output signal at the output thereof which is the algebraic product of said pair of input signals.

5. The regenerative motor control according to claim 1 wherein said field circuit means is further defined as means for controlling the magnitude of the field winding current energization responsive to the magnitude of the operative condition error signal.

6. The regenerative motor control according to claim 5 wherein said field circuit means includes means for providing substantially constant field winding current energization responsive to the operative condition error signal. in at least a portion of the operating range of the motor.

7. The regenerative motor control according to claim 6 wherein said field circuit means includes saturable amplifying means for providing substantially constant field winding current energization.

8. The regenerative motor control according to claim 4 wherein said field circuit means includes saturable amplifying means for providing substantially constant field winding current energization responsive to the operative condition error signal, whereby the output signal of said multiplier outside said transient period is directly proportional to the error signal.

9. The regenerative motor control according to claim 5 wherein said field circuit means is further defined as means for controlling the magnitude of the field winding current energization in proportion to the magnitude of said error signal.

10. The regenerative motor control according to claim 4 wherein said control includes polarity establishing means and wherein said algebraic multiplier means is further defined as providing an output signal to said armature circuit means having the polarity to energize the armature winding when the multiplier input signals are of the same polarity.

11. The regenerative motor control according to claim 1 wherein said armature circuit means includes an armature current regulating circuit having an input receiving said analog signal generating means signal as a reference signal and means providing an armature current feedback signal to the input of said armature current regulating circuit.

12. The regenerative motor control according to claim 3 wherein said armature circuit means includes an armature current regulating circuit having an input coupled to the output of said multiplier for receiving the output signal as a reference signal and means providing an armature current feedback signal to the input of the armature current regulating circuit.

13. The regenerative motor control according to claim 1 including an input amplifier connectable to said error signal source and connected to the input of said field circuit means and to an input of said analog signal generating means.

14. The regenerative motor control according to claim 12 including means connectable to said error signal source and connected to the input of said field circuit means and to an input of said analog signal generating means for limiting said error signal.

15. The regenerative motor control according to claim 14 wherein said means for limiting said error signal comprises a saturable amplifier.

16. The regenerative motor control according to claim 14 wherein said field circuit means includes means for providing substantially constant field winding current energization responsive to the operative condition error signal in at least a portion of the operating range of the motor.

17. The regenerative motor control according to claim 1 wherein said operative condition error signal source is in the control and is operatively associated with the motor armature for generating an error signal corresponding to the error between desired and actual conditions in said motor.

* * * * *